Aug. 26, 1924.
A. S. NOONAN
WINDSHIELD CLEANER
Filed Nov. 9, 1921  3 Sheets-Sheet 1
1,506,604
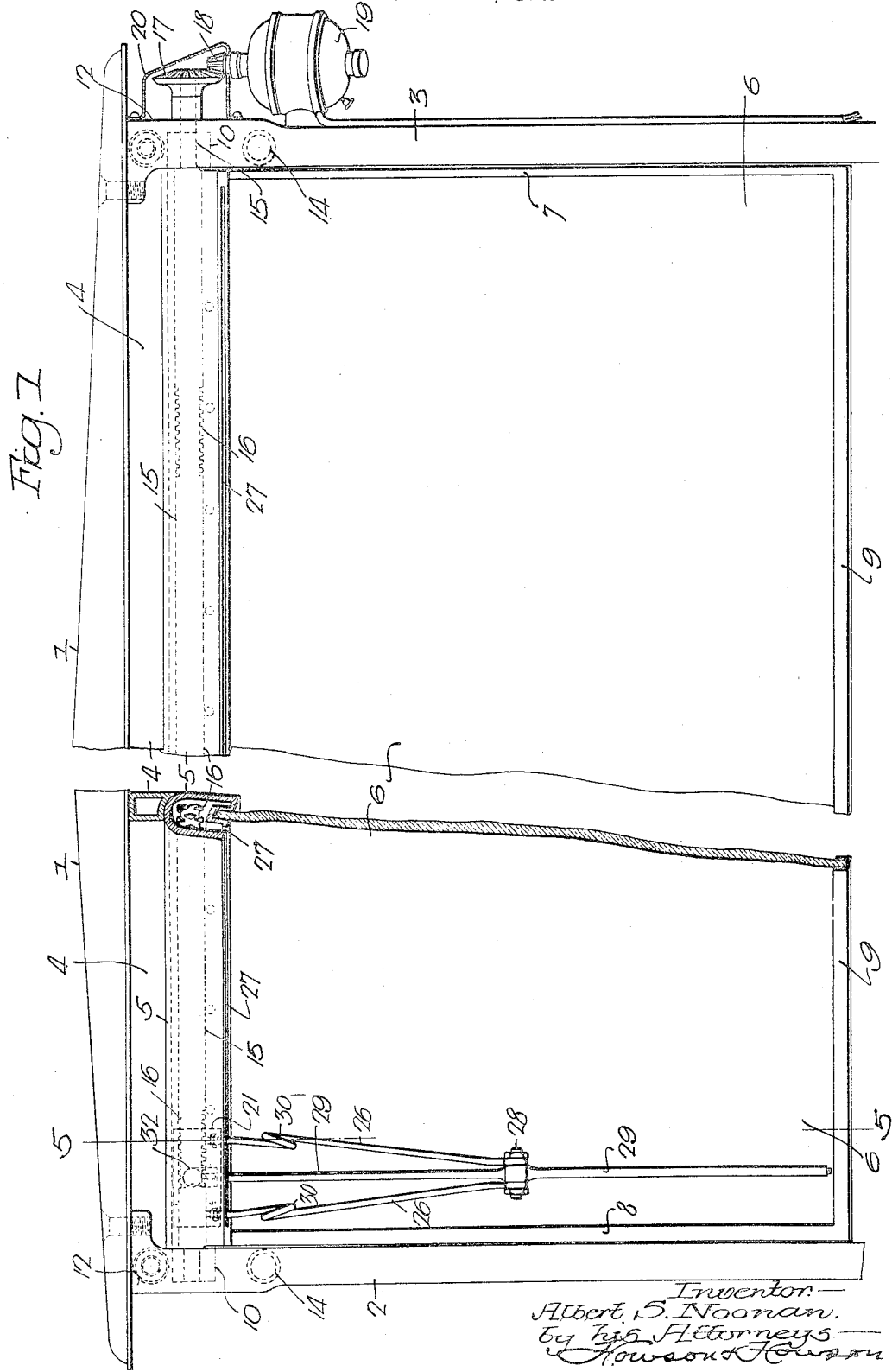

Aug. 26, 1924.
A. S. NOONAN
WINDSHIELD CLEANER
Filed Nov. 9, 1921
1,506,604
3 Sheets-Sheet 2
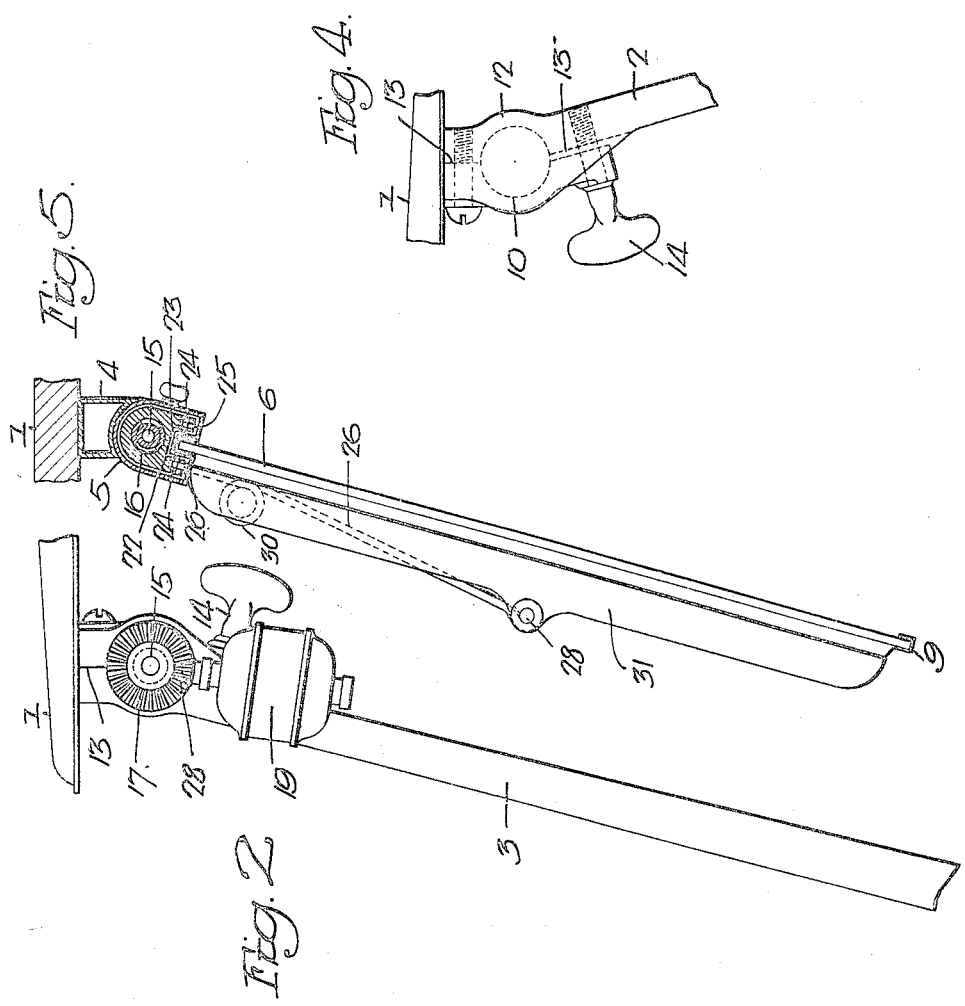
Inventor:—
Albert S. Noonan.
by his Attorneys
Howson & Howson Aug. 26, 1924.  1,506,604
A. S. NOONAN
WINDSHIELD CLEANER
Filed Nov. 9, 1921  3 Sheets-Sheet 3
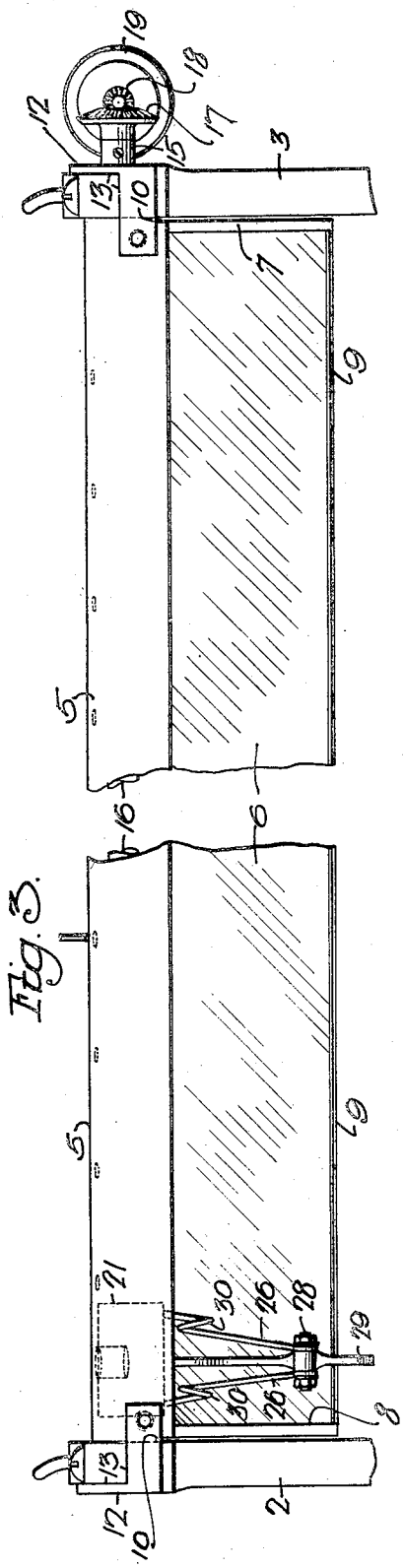
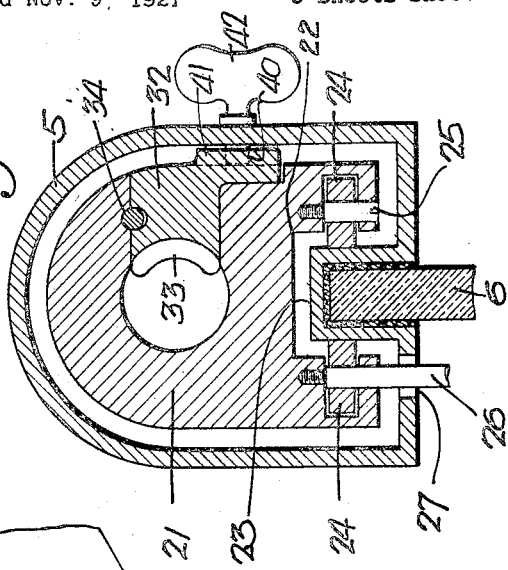
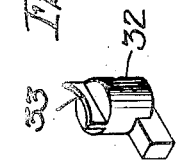
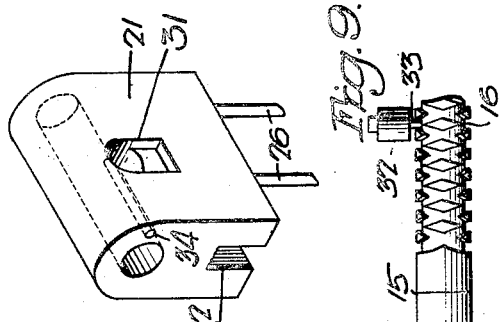
Inventor
Albert S. Noonan
by his Attorneys Patented Aug. 26, 1924.

1,506,604

UNITED STATES PATENT OFFICE.

ALBERT S. NOONAN, OF PHILADELPHIA, PENNSYLVANIA, ASSIGNOR TO FOSS-HUGHES COMPANY, OF PHILADELPHIA, PENNSYLVANIA, A CORPORATION OF PENNSYLVANIA AND MASSACHUSETTS.

WINDSHIELD CLEANER.

Application filed November 9, 1921. Serial No. 513,939.

*To all whom it may concern:*

Be it known that I, ALBERT S. NOONAN, a citizen of the United States, residing in Philadelphia, Pennsylvania, have invented a Windshield Cleaner, of which the following is a specification.

One object of this invention is to provide a device for automatically removing water, particles of moisture, sleet, dust, or the like, from the surface of a wind shield or similar transparent structure such as is commonly employed in a motor vehicle and the invention especially contemplates a novel mechanism for continuously reciprocating a cleaning member across the wind shield surface.

A further object of the invention is to provide novel means for supporting and reciprocating a cleaning bar on the surface of a wind shield whereby said bar shall be alternately moved in opposite directions by mechanism which shall be so mounted as not to interfere with the adjustment of the wind shield to various angles.

I further desire to provide a wind shield cleaning device with a novel form of automatically reciprocable carriage for supporting and actuating a cleaning member, together with novel means for transmitting movement to the carriage and automatically reversing the direction of such movement at the opposite ends of the wind shield or at any of a number of points intermediate said ends.

It is further desired to provide mechanism of the above class which shall be simple, reliable, compact and substantial in construction.

These objects and other advantageous ends I attain as hereinafter set forth, reference being had to the accompanying drawings, in which, Fig. 1 is a front elevation partly in vertical section, illustrating a wind shield equipped with my invention;

Fig. 2 is an elevation of one end of the wind shield and the associated parts shown in Fig. 1;

Fig. 3 is a plan of the wind shield and apparatus shown in Figs. 1 and 2;

Fig. 4 is a fragmentary elevation of that end of the wind shield opposite that shown in Fig. 2;

Fig. 5 is a vertical section on the line 5—5, Fig. 1;

Fig. 6 is a full size section on the line 6—6, Fig. 3;

Fig. 7 is a perspective view of one end of the top member of the wind shield including a perspective view of the bearing normally associated therewith;

Fig. 8 is a perspective view of the movable carriage forming part of my invention;

Fig. 9 is an elevation of one end of a diamond screw for actuating the carriage shown in Fig. 8; and Fig. 10 is a perspective view of the nut used in connection with said carriage.

In the above drawings 1 represents the forward edge of the roof or cover of a motor vehicle having associated with its ends two fixed frame members 2 and 3, between the upper ends of which extends a transverse frame member 4 immediately under the forward end of the roof structure 1 with which it forms a tight joint. In the present instance this transverse frame member is hollow and while being of substantially rectangular cross section, has its lower side made concave with a cylindrical curvature for the reception of the cylindrically curved upper side of the top frame member 5 of the wind shield proper.

Said shield in the present instance consists of a sheet or plate 6 of relatively heavy glass whose top edge extends into a recess of rectangular section formed in the under face of the frame member 5 and which in addition has side frame members 7 and 8 and a bottom frame member 9. This frame structure 5—9 with its glass plate is movably supported by the fixed side frame members 2 and 3, for which purpose the member 5 is constructed at its ends as shown in Fig. 7, with projecting portions 10 constituting trunnions and the latter are made up not only of the cylindrically curved projecting extremities of the member 5, but also each includes a block 11 fitting into the suitably formed extremity and forming with the same the desired cylindrically curved trunnion.

The blocks with the extremities 10 of the frame member 5 rotatably fit into bearings provided in the enlarged head portions 12 on the side frame members 2 and 3 respectively and these heads are each split or slotted as indicated at 13 (Fig. 4) so that by means of suitable thumb screws 14 they may be tightened on the trunnions of the wind shield frame member 5 to clamp it in any adjusted position.

Journalled in the blocks 11 and extending longitudinally through the hollow interior of the top frame member 5 of the wind shield is a shaft 15 whose body 16 is formed to constitute a diamond screw and one of whose ends projects beyond the frame member 3 where it has fixed to it a bevelled gear 17. Meshing with this is a bevelled pinion 18 driven from the armature shaft of an electric motor 19 mounted on and carried by said frame member 3 and two coacting gears 17 and 18 are inclosed by a casing 20 also carried on said bar.

Within the top wind shield member 5 is mounted a carriage or traveling member 21 slidably mounted on the threaded body of the shaft 15 and having a longitudinally extending slot 22 formed in its lower face to receive or fit over the inwardly projecting bead 23 at the bottom of the member 5 into which extends the upper edge of the glass plate 6. The traveling member 21 has two pairs of anti-friction rollers or wheels 24 mounted in suitable recesses in the sides of the slot 22 so as to project into the same and bear against the parallel sides of the bead 23. While the rollers on one side of said bead are mounted on short spindles or pins 25, those on the opposite side thereof are similarly mounted on the end portions of two spring arms 26 provided by a pair of relatively heavy, more or less resilient wires which extend downwardly from the traveling member through a slot 27 formed in the underside of the top frame member 5 and carrying at their lower ends a transverse pin or spindle 28 on which is pivoted a cleaning bar 29. The latter is preferably of such length as to extend from the top to the bottom of the pane of glass 6 to whose surface it is substantially perpendicular and against which it is at all times yieldingly pressed by the spring arms 26. For this purpose the latter are preferably formed with one or more coils 30.

Mounted in an opening 31 in the side of the traveling member 21 is a cylindrical piece 32 having a projecting tooth 33 designed to coact with the threads of the diamond screw 16 and this is more or less loosely held in said opening 31 by a pin 34 so as to be free to oscillate to a limited extent. The tooth 33 so coacts with the thread of the diamond screw 16 that when the latter is rotated by the motor 19 through the gears 18 and 17 of said tooth, the piece 32 and the traveling member 21 are caused to travel longitudinally upon the screw 16 and when the tooth 33 has reached the end of the latter, it follows the thread so that its direction of motion is reversed so that the traveling member 21 is caused to move toward the opposite end of said screw which has a similar construction and action.

With the above described arrangement of parts when current is supplied to the electric motor 19, the rotation of the shaft 15 thereby continuously in one direction causes the traveling member 21 and with it the cleaning bar 29 to be continuously reciprocated from one end to the other of the glass sheet 6, it being understood that the threaded body of the shaft 15 has such a length and is so positioned in regard to said glass plate that the cleaning member 29 is moved as above described practically from one end to the other of the wind shield. Obviously the other may be angularly adjusted with relation to the frame members 2—3 without in any way affecting the operativeness of the apparatus above described, since the shaft 15 is concentric with the trunnions 10—11. The constant reciprocation of the vertically extending cleaner bar 29 speedily removes any sleet, rain, dust, or other material falling on or driven against the surface of the wind shield glass.

If for any reason it should be desired that the cleaner should operate on a more or less limited area of the wind shield instead of moving from one end to the other thereof, I may reverse the direction of movement of the traveling member 21 at any of a number of points by providing on the frame member 5 one or two dogs or stops such as the pins 40. These are threaded into any of a number of openings in the member 5 in such positions as to engage a lug 41 formed integral with or connected to the tooth carrying piece 32 and each of said pins has a flattened or other suitably formed head 42 to permit of its convenient manual operation. These pins 40 are preferably placed adjacent the limits of the desired path of movement of the cleaning member and as the traveling member 21 approaches one of said pins the dial 41 of its tooth carrying piece 32 strikes said pin, causing said piece to be axially turned through an angle determined by the lost motion permitted by the pin 34 so that the inclination of the tooth 33 is changed sufficiently to cause it to travel back in the groove of the diamond screw 16.

When the traveling member approaches the other end of its path of movement, its direction of motion is reversed either at one end of the groove of the diamond screw or it may be reversed by reason of the dial 41 striking the second pin 40, whereupon the piece 32 is sufficiently turned to cause the tooth to again reverse in the groove of said screw. By this means the path of movement of the traveling member with the cleaning element may be varied as desired and the area of the wind shield operated on may be positioned at any part of the glass desired.

I claim:

1. The combination of a wind shield having a hollow frame member formed with a longitudinally extending slot; a traveling member mounted in said frame member; a motor; mechanism driven from said motor for reciprocating said traveling member in the frame member; a cleaning member operative on the windshield, one or more spring elements connected to the cleaning member and extending through the slot of the frame member and connected to the traveling member for transmitting movement therefrom to the cleaning member.

2. The combination of a supporting frame, a windshield including a hollow frame member pivotally supported on said frame, a motor mounted on the supporting frame, a screw shaft mounted coaxially within said hollow frame, means operatively connecting the shaft to the motor, a carriage reciprocated on said shaft, a cleaning element for the glass of the windshield carried by said carriage by means extending through an elongated slot in the hollow frame member, and a device for reversing the direction of movement of the cleaning member.

3. In a windshield cleaner, the combination of a fixed supporting frame having a horizontal top member formed with a concave face; a wind shield having a hollow top frame formed with a cylindrically curved outer portion and pivotally supported by the fixed frame with said cylindrically curved portion fitting the concave face thereof; a movable carriage guided within the top frame of the wind shield; a cleaning member connected to the carriage through an elongated slot in the frame and engaging the glass of the wind shield; and means for reciprocating the carriage in the top frame member of the wind shield to cause the cleaning member to be moved over the glass.

ALBERT S. NOONAN.